United States Patent [19]
Fortmann

[11] Patent Number: 5,742,023
[45] Date of Patent: Apr. 21, 1998

[54] METHOD FOR MONITORING A WELDING MACHINE, METHOD FOR REGULATING THE WELDING MACHINE AND DEVICE FOR CARRYING OUT THE METHOD

[75] Inventor: Manfred Fortmann, Much, Germany

[73] Assignee: Siemens Aktiengesellschaft, Muenchen, Germany

[21] Appl. No.: 645,243

[22] Filed: May 13, 1996

[30]   Foreign Application Priority Data

Nov. 11, 1993 [DE] Germany .......................... 43 38 449.8

[51] Int. Cl.⁶ ...................................... B23K 11/25
[52] U.S. Cl. ............................ 219/109; 219/110
[58] Field of Search ........................... 219/110, 109, 219/117.1

[56]   References Cited

U.S. PATENT DOCUMENTS

| | | | |
|---|---|---|---|
| 3,406,272 | 10/1968 | Ehrlich | 219/109 |
| 4,214,164 | 7/1980 | Traub et al. | 219/110 |
| 4,359,622 | 11/1982 | Dostoomian et al. | 219/110 |
| 5,399,827 | 3/1995 | Fortmann | 219/109 |

FOREIGN PATENT DOCUMENTS

| | | |
|---|---|---|
| 0 610 148 A1 | 8/1994 | European Pat. Off. . |
| 80 20047 | 9/1980 | France . |
| 27 51 643 B2 | 5/1978 | Germany . |
| 31 21 497 C2 | 4/1982 | Germany . |
| 31 36 726 C2 | 5/1982 | Germany . |
| 252 778 A1 | 12/1987 | Germany . |
| 268 648 A1 | 6/1989 | Germany . |
| 37 42 461 C2 | 6/1989 | Germany . |
| 40 29 117 A1 | 3/1991 | Germany . |
| 40 39 847 C2 | 9/1992 | Germany . |
| WO92/10326 | 6/1992 | WIPO . |
| WO93/04812 | 3/1993 | WIPO . |

OTHER PUBLICATIONS

Prozeβanalyse des Widerstandspunktschweiβens—Einfluβ des Elektrodenverschleiβes und Folgerungen für eine Prozeβregelung (Dorn et al.), dated 1983, pp. 21–26.

Prozeβanalyse des Widerstandspunktschweiβens—Verfahren und Erkenntnisse (Dorn et al.), dated 1980, vol. 1, pp. 20–24.

European Search Report No.94 46 0001, dated May 24, 1994.

International Search Report No.92/00818, dated Dec. 1, 1992.

International Search Report No.91/00972, dated Mar. 24, 1992.

*Primary Examiner*—Clifford C. Shaw
*Attorney, Agent, or Firm*—Herbert L. Lerner; Laurence A. Greenberg

[57]   ABSTRACT

A welding machine produces a spot-welded joint between two components to be welded together by at least one electrode being in contact with one of the components, by passing a welding current through the components during a welding period, and measuring a thermo-electrical voltage between the electrode and the components outside the welding period. A method for monitoring the welding machine on the basis of the thermo-electrical voltage includes determining a monitoring variable from the thermo-electrical voltage and comparing the monitoring variable with a reference variable of the welding machine. The method can be used for regulating a welding machine, especially for producing a plurality of spot-welded joints. A device for carrying out the method includes at least one measuring instrument, in particular a voltage meter, disposed between the components to be welded together and the electrode. An evaluation and regulating device is connected downstream of said measuring instrument.

19 Claims, 1 Drawing Sheet

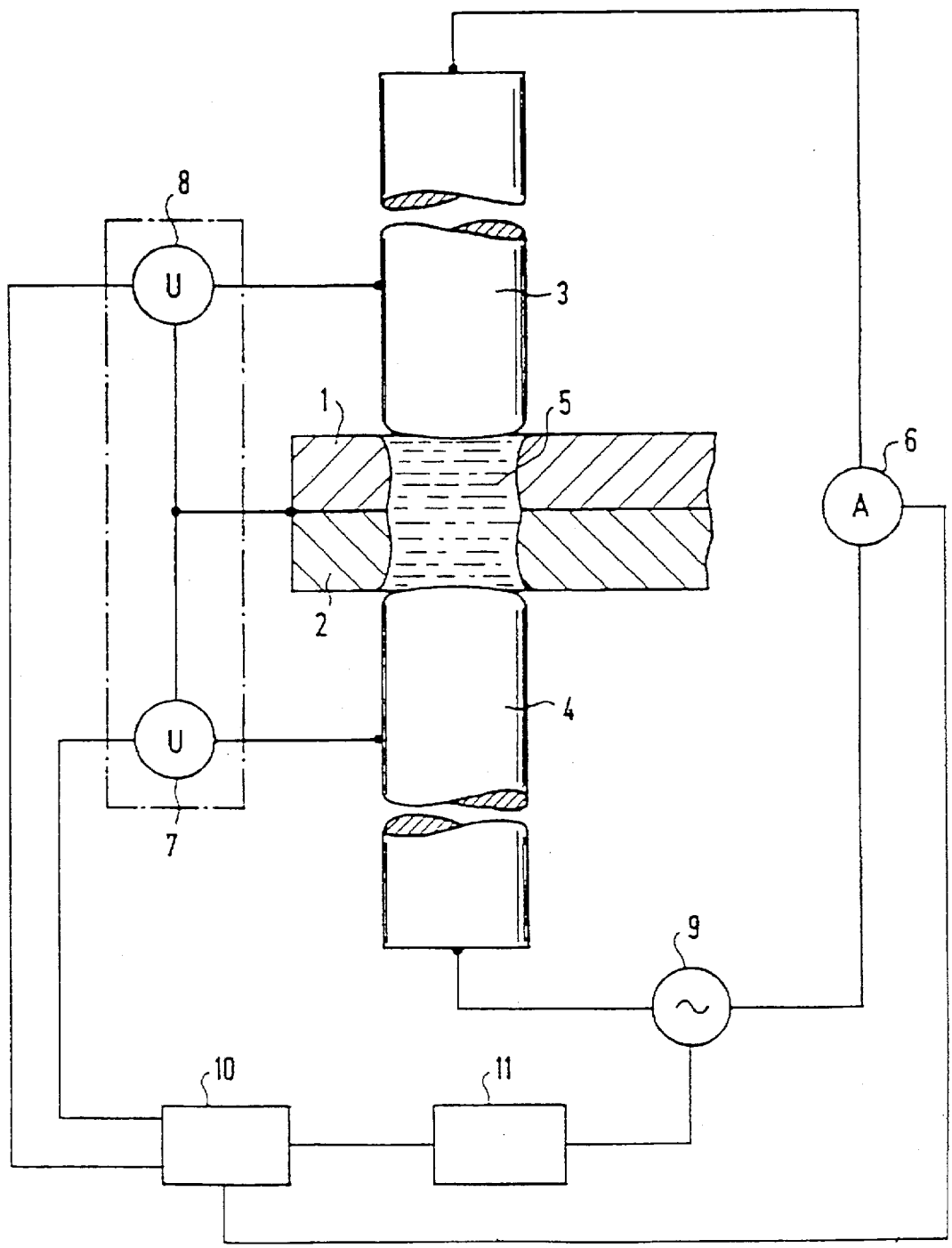

METHOD FOR MONITORING A WELDING MACHINE, METHOD FOR REGULATING THE WELDING MACHINE AND DEVICE FOR CARRYING OUT THE METHOD

CROSS-REFERENCE TO RELATED APPLICATION

This application is a Continuation of International application Ser. No. PCT/DE94/01291, filed Nov. 2, 1994.

BACKGROUND OF THE INVENTION

FIELD OF THE INVENTION

The invention relates to a method for monitoring a welding machine, with which a spot-welded joint is produced between two components to be welded together through the use of at least one electrode being in contact with one of the components, a welding current is passed through the components during a welding period, and a thermo-electrical voltage is measured between the electrode and the components outside the welding period. The invention also relates to a method for regulating the welding machine and a device for carrying out the method.

Welding machines with which spot-welded joints are produced between components, in particular metal components, are used in many fields in industry, such as in automobile manufacturing. The welding machines are often used in the course of automated production processes. A spot-welded joint produced with a welding machine often serves not merely as a provisional stitching together of components but rather as a final connection between the components. There is accordingly a need for monitoring a welding machine to determine whether or not it is functioning properly and assures the production of spot-welded joints that meet specified technical requirements. Especially in an automated production process, in which many spot-welded joints are produced in chronological succession, quasi-continuous monitoring of the welding machine and closed-loop control or regulation of the welding machine are of particular interest.

Monitoring of the welding machine has been carried out thus far either by workers or, particularly in an automated welding machine, by a plurality of measurement sensors, which are disposed either inside the welding machine or in the vicinity of the spot-welded joint. Besides the advantage of saving major hardware expense, particular for cabling and data processing, the use of a plurality of sensors has the advantage of exposing the sensors to the sometimes unfavorable conditions prevailing in the surroundings of the spot-welded joint.

German Patent DE 31 36 726 C2 describes monitoring of a welding machine in which information about the presence or absence of a contact between the welding electrodes and the workpiece to be welded is gained with electrical signals. That information is obtained through continuous measurement of the residual voltage on the primary side of the welding transformer, which makes for an indirect measurement of the impedance of the secondary side of the welding transformer. The indirect measurement of the impedance is carried out outside the welding period. In the welding period, a welding current is passed through the electrodes and the workpieces in order to produce a welded joint. German Patent DE 31 36 726 C2 does not suggest any more-extensive monitoring of the welding machine.

A method for checking the quality of spot-welded joints is described in Published International Patent Application WO 92/10326 A1. In that method, after the end of the welding operation, a thermo-electrical voltage is measured between an electrode of the welding machine and one of the components to be welded. The temperature at the spot-welded joint is in turn determined from the thermo-electrical voltage, and an evaluation of the quality of the spot-welded joint is performed from its course. The method described in Published International Patent Application WO 92/10326 A1 is partly employed in the present invention, and therefore the method and the entire contents of Published International Patent Application WO 92/10326 A1 are considered to be part of the present disclosure. It has also already been proposed that a thermo-electrical voltage, measured before the formation of the spot-welded joint, between the electrode and the component in contact with that electrode be used to evaluate the quality of the spot-welded joint.

SUMMARY OF THE INVENTION

It is accordingly an object of the invention to provide a method for monitoring a welding machine, a method for regulating the welding machine and a device for carrying out the method, which overcome the hereinafore-mentioned disadvantages of the heretofore-known methods and devices of this general type, which are suitable for an automated production process, which are simple and which can be carried out at little effort or expense even under extreme external conditions.

With the foregoing and other objects in view there is provided, in accordance with the invention, in a method for monitoring a welding machine for producing a spot-welded joint between two components to be welded together by at least one electrode being in contact with one of the components, which includes passing a welding current through the components during a welding period, and measuring a thermo-electrical voltage between the electrode and the components outside the welding period, the improvement which comprises monitoring the welding machine on the basis of the thermo-electrical voltage, by determining a monitoring variable from the thermo-electrical voltage and comparing the monitoring variable with a reference variable of the welding machine.

With the method, the welding machine can be monitored for proper functional capability both before and after the actual welding, or in other words outside the welding period. With the method, information about the welding machine is gained that can be used as criteria for deciding how welding is to be carried out. The method is also simple to perform, because in particular only little hardware expense is needed to realize the invention, since in particular there is no need for measurement sensors in the vicinity of the spot-welded joint to be produced. The monitoring variable determined from the thermo-electrical voltage is compared with a reference variable or a plurality of reference variables of the welding machine, such as the allowable temperature of the electrode, and comparison variables for an adequate spot-welded joint, and as a result monitoring of the welding machine is accomplished. An evaluation of the thermo-electrical voltage can be carried out under normal external conditions, such as room temperature, freedom from electrical fields, etc., and in particular at a sufficient distance away from the spot-welded joint.

The thermo-electrical voltage can be measured simply and precisely, and the measurement can be performed remote from the spot-welded joint to be produced, so that suitable measuring instruments are not exposed to the possibly extreme external conditions, such as high temperature or high electrical fields, in the vicinity of the spot-welded joint.

In accordance with another mode of the invention, the thermo-electrical voltage is measured at a plurality of times and a measurement can be made both before the onset of the actual welding and after the end of the welding. Measuring at various times can provide a wider information spectrum and serves the purpose of both measurement reliability and further-improved monitoring.

In accordance with a further mode of the invention, an ascertainment of a course over time of the thermo-electrical voltage and therefore of the monitoring variable is performed, so that a large continuous monitoring of the welding machine is moreover achieved. A variation in functional capability of the welding machine over time is easily detectable as a result, which is especially advantageous in the production of a rapid succession of spot-welded joints.

In order to produce a spot-welded joint, the electrode is put into contact with one of the components to be welded, and the components are pressed together. During the welding time, a welding current is passed through the components, and turning the welding current on and off is controlled by a switch device of the welding machine.

In accordance with an added mode of the invention, the welding current is an alternating current. As a result, once again a measurable electrical voltage is a periodic signal, which has not only an oscillation amplitude but also an easily determined mean value. For example, the oscillation amplitude may be a measure for the electrical contact between the electrode and the component to be welded, and the mean value may be a measure for the thermo-electrical voltage between the electrode and the component, or in other words for a temperature. Welding machines that weld with an alternating current often have a thyristor circuit for turning on the welding current. That dictates a leakage current with a constant frequency, in particular 50 Hz in the case of operation using the public electrical power grid available in Germany. That periodic signal can easily be discriminated from a nonperiodic signal, such as a thermo-electrical voltage, both before the beginning of the welding period and after the end of the welding period.

Advantageously, the electrode is formed of a first material, in particular a first metal, and the component with which it is put into contact by the welding machine is formed of a second material, that is different from the first, and in particular is a second metal. At a temperature of the electrode that is different from the temperature component, a thermo-electrical voltage is thus dictated between the electrode and the component. This thermo-electrical voltage is unambiguously associated with a temperature difference between the electrode and the component. This association can be found if the two materials are known or from the literature. If knowledge of the materials is lacking, then that association can be determined simply by a calibration measurement of the thermo-electrical voltage with simultaneous measurement of the temperature, using separate calibrated thermocouples. Calibration by evaluating sample welds is also possible.

In accordance with an additional mode of the invention, the monitoring of the cooling of the electrode of the welding machine is carried out with the thermo-electrical voltage measured before the beginning of the welding period. A temperature of the electrode is determined as the monitoring variable, and if a predetermined value is exceeded, or in other words at a higher temperature than a predetermined reference temperature, the conclusion is drawn that there is a defect in the cooling of the electrode. Monitoring of the cooling is also possible with the thermo-electrical voltage measured after the welding period, or with a combination of a signal measured before and after the welding period.

In accordance with yet another mode of the invention, after the end of the welding period, in other words after the welding current has been turned off, the components continue to be pressed together during a predetermined length of time by the welding machine. This enables solidification of a molten region between the components as a result of which a durable joint is attained. Monitoring of this length of time in which the welding machine presses the components together after the end of the welding period is preferably effected through a thermo-electrical voltage measured after the welding period.

In accordance with yet a further mode of the invention, in the process monitoring is performed to determine whether or not the length of time is long enough to produce a spot-welded joint of adequate quality. The length of time is evaluated as being long enough whenever, using the monitoring variable, that is the temperature course, determined from the thermo-electrical voltage, a solidification heat released in the spot-weld joint which reflects the solidification of the molten region between the components, is detected. This monitoring therefore furnishes a criterion for evaluating whether or not the length of time is long enough.

In accordance with yet an added mode of the invention, in order to produce a spot-welded joint of adequate quality, it is moreover necessary for an electrical power to be fed in by the welding machine during the welding period. That power enables melting of a region and as a result a firm join between the components. Monitoring this supplied power is advantageously carried out by a thermo-electrical voltage measured after the end of the welding period. The electrical power is evaluated as being adequate if a solidification heat released in the spot-welded joint exceeds a predetermined value. The invention assumes in this case that the value of the solidification heat being released unequivocally reflects the size of the molten region between the components. The solidification heat is advantageously ascertained through a temperature course determined from the signal at the spot-welded joint.

In accordance with yet an additional mode of the invention, with great advantage, the invention is suitable for monitoring a welding machine in which the spot-welded joint is made with two electrodes disposed on opposite sides of the components. An associated thermo-electrical voltage between each of the two components and the respective associated component is then measured, and from these two values a mean value is formed. In the case of the welding machine in which the welding current is an alternating current and the electrodes are joined together virtually without resistance through a transformer, the mean value of the thermo-electrical voltages can be formed without measuring the individual signals beforehand. In the case of the welding machine in which the welding current is a direct current and in which the electrodes are joined together through an electrical element that has resistance, such as a diode with a contact resistance on the order of magnitude of 5 $\Omega$, then a separate measurement of the associated thermo-electrical voltage takes place, optionally with ensuing averaging. This mean value then serves as a monitoring variable. With differently shaped electrodes, it may be favorable to use the thermo-electrical voltage of one electrode to monitor the welding machine and the thermo-electrical voltage of the other electrode as a control signal.

In accordance with again another mode of the invention, with two differently shaped electrodes, an asymmetrical location of a melting zone between the components is possible. The area of contact between one electrode, the thin electrode, and the components is advantageously smaller than the area of contact between the other electrode, the thick electrode, and the components. During the welding period, more pronounced heating of the components occurs in the vicinity of the thin electrode than in the vicinity of the thick electrode. As a result, the melting zone is located closer to the thin electrode than to the thicker one. This may be advantageous especially in welding components of different thickness. The location of the melting zone depends, among other factors, on the ratio of the contact area of the thin electrode to the contact area of the thick electrode. A change in the contact area of the thin electrode, and in particular an enlargement of it from wear, which may occur from a succession of a plurality of welding operations, can be determined by the location of the melting zone, from a comparison with reference welding operations. A reference welding operation is, for instance, carried out for a constant, known ratio of the contact areas and where the parameters of the welding machine are known precisely. Through the use of a separate measurement of the thermo-electrical voltages of the electrodes after the end of the welding interval, one reference temperature course for each electrode is then determined. The two reference temperature courses indicate the ratio of the contact areas, so that once the contact area of the thick electrode is known, the contact area of the thin electrode is known as well, and vice versa. Through the use of the location of the melting zone, which is determined, for instance, from the temperature courses of the electrodes, it is especially advantageously possible, particularly by comparison with reference welding operations, to carry out monitoring of the wear of at least one of the electrodes.

In accordance with again a further mode of the invention, the monitoring of the welding machine through the use of the thermo-electrical voltage measured outside the welding period can optionally be supplemented with a welding signal measured during the welding period, for example pertaining to the welding voltage or welding current. The entire power supplied to the components during the welding period, for instance, or the electrical resistance between the electrodes and the components can be determined with this welding signal. In combination with the thermo-electrical voltage measured outside the welding period, this furnishes additional information for monitoring the welding machine.

With the objects of the invention view there is also provided, in accordance with the invention, a method for regulation, i.e., closed-loop control, of the welding machine, in particular when a plurality of spot-welded joints are produced.

This control is effected in this case through information about the welding machine obtained from the thermo-electrical voltage measured outside the welding machine and optionally from information about the welding machine that has been determined from the welding signal measured during the welding period.

In accordance with another mode of the invention, the welding machine is regulated for proper, rapid carrying out of the welding operations, especially in a chronological succession of welding operations, of the kind carried out in automatic production processes, such as in the automobile industry. Regulating the welding machine in such a way that the spot-welded joints produced with the chronological succession of welding operations have adequate quality makes it possible to dispense with later quality control and thus markedly reduces the rejection rate. This can be done especially simply with this method, since a signal, the thermo-electrical voltage, measured after the end of the welding period can be utilized directly for quality evaluation, and as a result the regulation of the welding machine can be performed in such a way that a new welding operation is made dependent on the quality of the previous welding operations.

In accordance with a further mode of the invention, a signal measured before the welding period, for instance a leakage voltage, is used for open-loop control of turning on the welding current. With the signal ascertained there the electrical contact between the electrode and the component touching it is sufficient to produce a spot-welded joint of adequate quality, at a given setting of the welding machine. If the contact is sufficient, then the welding current is turned on. Any defect that might simultaneously be found in the cooling of the electrode can moreover be used as a criterion for interrupting the succession of welding operations.

In accordance with an added mode of the invention, a thermo-electrical voltage measured after the end of the welding period is used to regulate certain parameters of the welding machine, such as the length of time during which the components are pressed together, or the electrical power supplied during the welding period. The parameters are thereby regulated in such a way that particularly if there is adequate electrical contact between the electrode and the components, a spot-welded joint of adequate quality is produced with the welding operation. This is especially advantageous in automated production processes, because it enables a marked increase in productivity. In order to regulate a parameter of the welding machine, a welding signal measured during the welding period can moreover be used as well.

With the objects of the invention in view there is additionally provided, in accordance with the invention, a device for monitoring a welding machine for producing a spot-welded joint between two components to be welded together by at least one electrode being in contact with one of the components, comprising a current source for passing a welding current through the components during a welding period; at least one measuring instrument, such as a voltage meter, disposed between the components to be welded together and the electrode for measuring a thermo-electrical voltage between the electrode and the components outside the welding period; and an evaluation and regulating device connected downstream of the measuring instrument for monitoring the welding machine on the basis of the thermo-electrical voltage, by determining a monitoring variable from the thermo-electrical voltage and comparing the monitoring variable with a reference variable of the welding machine.

The measuring instrument and the evaluation and regulating device may be disposed at some distance from the spot-welded joint, for instance in a housing belonging to the welding machine. Moreover, the evaluation and regulating device may be provided for storing the measured signals, or the measurement results derived from these signals, in memory, and for transmitting the signal or the results of the measurement.

Other features which are considered as characteristic for the invention are set forth in the appended claims.

Although the invention is illustrated and described herein as embodied in a method for monitoring a welding machine, a method for regulating the welding machine and a device for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The figure of the drawing is a schematic and block circuit diagram of a device for carrying out the method, along with a welding machine and components to be welded which are shown in a fragmentary, diagrammatic, partly sectional view.

DESCRIPTION OF THE PREFERRED EMBODIMENTS

Referring now in detail to the single figure of the drawing, in which only those components that are necessary for an explanation of the invention are shown, there are seen two components 1, 2, for instance steel sheets, which are joined together by a spot weld. This is done by putting two electrodes 3, 4 which, for instance, are formed of copper, opposite one another and into contact with the components 1, 2 that are being pressed together by a welding machine. During a welding period, a welding current generated by an alternating current source 9 is passed through the electrodes 3, 4 into the components 1, 2 to be welded together. This produces a spot-welded joint 5. Upon solidification of a melt that is initially present, the components 1, 2 are durably joined together.

The intensity of the welding current is measured during the welding period with the aid of an ammeter 6. Outside a welding period, an electrical voltage, in particular a thermo-electrical voltage or a leakage voltage corresponding to a leakage current, is measured with voltage meters 7, 8. The measured electrical voltage is delivered to an evaluation and regulating device 10. In this evaluation and regulating device 10, a thermo-electrical voltage, for instance, is separated from a leakage voltage, and a temperature at the spot-welded joint 5 before and after the welding period is determined from the thermo-electrical voltage. The temperature before the onset of the welding period serves to monitor the cooling of the electrodes 3, 4, and the temperature determined after the end of the welding period serves to detect the solidification of the melt that is present at the spot-welded joint 5. As a result, the electrical power supplied to the spot-welded joint 5 during the welding period and the length of time during which the components are pressed together are monitored. The results of monitoring which are ascertained in the evaluation and regulating device 10 are supplied, for regulation of the welding machine, to a switch device 11 of the welding machine, for instance. The beginning of the welding period, the length of the welding period, and the welding current and/or a welding voltage can be regulated. Moreover, the results of monitoring can be delivered to a non-illustrated device for pressing together the components 1, 2, and the length of time during which the components 1, 2 are pressed together is regulated. It is understood that the measured signals which are ascertained by the ammeter 6 and the voltage meters 7, 8, and the information derived from them, can be carried onto a data processing device, which for the sake of simplicity is not shown. Storage of the information in memory for later analysis of the welding operation, especially when there is a rapid succession of welding operations, is additionally advantageous.

The method is distinguished by a very low expense for hardware in the vicinity of the spot-welded joint and by being especially easy to carry out. Particularly in an automated production process, in which many spot-welded joints are to be produced in chronological succession, the method is suitable for monitoring the welding machine as to its functional capability and for regulating the welding process. The production process can be sped up and the rejection rate markedly reduced, and as a result, the productivity can be increased.

I claim:

1. In a method for monitoring a welding machine for producing a spot-welded joint between two components to be welded together by at least one electrode being in contact with one of the components, which comprises:

passing a welding current through the components during a welding period, and measuring a thermo-electrical voltage between the electrode and the components outside the welding period, monitoring functional capability of the welding machine on the basis of the thermo-electrical voltage, by determining a monitoring variable from the thermo-electrical voltage and comparing the monitoring variable with a reference variable of the welding machine.

2. The method according to claim 1, which comprises measuring the thermo-electrical voltage at a plurality of times.

3. The method according to claim 2, which comprises ascertaining the thermo-electrical voltage as a function of time.

4. The method according to claim 1, which comprises passing an alternating current through the components as the welding current.

5. The method according to claim 1, which comprises monitoring cooling of the electrode of the welding machine by determining a temperature of the electrode from the thermo-electrical voltage, and concluding that a defect exists in the cooling, if a temperature of a predetermined value is exceeded.

6. The method according to claim 5, which comprises monitoring the cooling of the electrode of the welding machine with the thermo-electrical voltage measured before the welding period begins.

7. The method according to claim 1, which comprises monitoring a pressing together of the components with the welding machine after an end of the welding period through the use of the thermo-electrical voltage, for determining if a length of time that the components are pressed together has been long enough to produce a spot-welded joint of adequate quality.

8. The method according to claim 7, which comprises evaluating the length of time as being long enough if a solidification heat released in the spot-welded joint is detected with the thermo-electrical voltage.

9. The method according to claim 1, which comprises monitoring an electrical power fed into the components by the welding machine during the welding period through the use of the thermo-electrical voltage measured after an end of the welding period, and evaluating the electrical power as being adequate if a solidification heat released in the spot-welded joint being detected with the thermo-electrical voltage, exceeds a predetermined value.

10. The method according to claim 1, which comprises measuring an associated thermo-electrical voltage for each of two electrodes disposed on opposite sides of the components, and forming a mean value from the two thermo-electrical voltages.

11. The method according to claim 1, which comprises monitoring wear of at least one of two electrodes disposed on opposite sides of the components, by measuring an associated thermo-electrical voltage for each electrode, determining a location of a melt zone developing between the components from the two measured voltages, and measuring wear of at least one of the electrodes through the use of the location.

12. The method according to claim 1, which comprises additionally monitoring the welding machine with at least one welding signal measured during the welding period.

13. In a method for regulating a welding machine for producing a plurality of spot-welded joints between two components to be welded together by at least one electrode being in contact with one of the components, which includes passing a welding current through the components during a welding period, and measuring a thermo-electrical voltage between the electrode and the components outside the welding period, the improvement which comprises:

monitoring the welding machine on the basis of the thermo-electrical voltage, by determining a monitoring variable from the thermo-electrical voltage and comparing the monitoring variable with a reference variable of the welding machine.

14. The method according to claim 13, which comprises regulating parameters of the welding machine in a chronological succession of welding operations through the use of the thermo-electrical voltage.

15. The method according to claim 14, which comprises measuring a thermo-electrical voltage before the welding period for open-loop control of turning on a welding current.

16. The method according to claim 13, which comprises measuring a thermo-electrical voltage before the welding period for open-loop control of turning on a welding current.

17. The method according to claim 13, which comprises measuring a thermo-electrical voltage after an end of the welding period to regulate parameters of the welding machine for producing a spot-welded joint of adequate quality with the welding current.

18. A device for monitoring the functional capability of a welding machine for producing a spot-welded joint between two components to be welded together by at least one electrode being in contact with one of the components, comprising:

a current source for passing a welding current through the components during a welding period;

at least one measuring instrument disposed between the components to be welded together and the electrode for measuring a thermo-electrical voltage between the electrode and the components outside the welding period; and an evaluation and regulating device connected downstream of said measuring instrument for monitoring the welding machine on the basis of the thermo-electrical voltage, by determining a monitoring variable from the thermo-electrical voltage and comparing the monitoring variable with a reference variable of the welding machine.

19. The device according to claim 18, wherein said at least one measuring instrument is a voltage meter.

* * * * *

UNITED STATES PATENT AND TRADEMARK OFFICE
CERTIFICATE OF CORRECTION

PATENT NO : 5,742,023
DATED : April 21, 1998
INVENTOR(S): Manfred Fortmann

It is certified that error appears in the above-identified patent and that said Letters Patent is hereby corrected as shown below:

On the title page, insert

Item [63]   as follows:

Continuation of PCT/DE94/01291, Nov. 2, 1994.

Signed and Sealed this

Third Day of November, 1998

*Attest:*

BRUCE LEHMAN

*Attesting Officer*         Commissioner of Patents and Trademarks